United States Patent [19]

Yoshida et al.

[11] 4,178,158

[45] Dec. 11, 1979

[54] APPARATUS FOR WET PROCESS DEHYDRATION OF AIR TO BE SUPPLIED TO BLAST FURNACE

[75] Inventors: Toru Yoshida, Hachioji; Kameo Hosoi, Warabi; Takehisa Tanaka, Yokohama; Seiji Hirai; Masakazu Nakauji, both of Sakai, all of Japan

[73] Assignees: Takasago Thermal Engineering Co., Ltd.; Nippon Steel Corporation, both of Tokyo, Japan

[21] Appl. No.: 910,470

[22] Filed: May 30, 1978

[30] Foreign Application Priority Data

Jun. 3, 1977 [JP] Japan .................................. 52-64663
Jun. 3, 1977 [JP] Japan .................................. 52-64665

[51] Int. Cl.$^2$ ...................... B01D 53/14; B01D 47/14
[52] U.S. Cl. ......................................... 55/160; 55/208; 55/213; 55/228; 55/387
[58] Field of Search ..................... 55/21, 32, 89, 160, 55/208, 213, 228, 387, 390; 137/4, 91, 92

[56] References Cited

U.S. PATENT DOCUMENTS

| | | | |
|---|---|---|---|
| 1,925,833 | 9/1933 | French | 137/4 X |
| 2,221,450 | 11/1940 | Jennings et al. | 55/32 X |
| 2,557,204 | 6/1951 | Richardson | 55/32 |
| 2,596,352 | 5/1952 | Wuensch | 137/91 |
| 2,881,853 | 4/1959 | Kelley | 55/32 X |
| 2,935,154 | 5/1960 | Kelley | 55/32 X |
| 3,064,952 | 11/1962 | Brown | 261/131 X |
| 3,712,026 | 1/1973 | Griffiths et al. | 55/32 |
| 3,750,369 | 8/1973 | Friedland | 55/32 X |

*Primary Examiner*—Robert H. Spitzer
*Attorney, Agent, or Firm*—Kane, Dalsimer, Kane, Sullivan and Kurucz

[57] ABSTRACT

Apparatus for dehydrating air to be supplied to a blast furnace comprising a dehydration assembly wherein intake air is dehydrated by contact with a circulating hygroscopic liquid and a regeneration assembly wherein the liquid is regenerated by contact with air under heating with steam, characterized in that a cylinder through which a part of the circulating liquid is caused to flow is provided for comparing the pressure of the liquid with a reference liquid to detect the concentration of the circulating liquid, the regeneration assembly is divided into a plurality of independently operable units each having regeneration means, means for controlling the steam flow rate according to the detected concentration, means for controlling the liquid flow rate according to the detected concentration, and at least one heat exchanger for transferring sensible heat between at least one fluid entering said regeneration means and at least one fluid leaving said regeneration means.

9 Claims, 5 Drawing Figures

APPARATUS FOR WET PROCESS DEHYDRATION OF AIR TO BE SUPPLIED TO BLAST FURNACE

BACKGROUND OF THE INVENTION

1. Field of the Invention

The present invention relates to an apparatus for wet process continuous dehydration of atmospheric air to be supplied to a blast furnace. It relates to such an apparatus in which a large volume of air required for use in the operation of a blast furnace may be processed by bringing it into contact with regenerative hygroscopic liquid so as to reduce the moisture content of the air to a level not higher than a predetermined level throughout the year. More particularly, it relates to such an apparatus in which the regeneration of the hygroscopic liquid can be carried out precisely and effectively in accordance with the change in the atmospheric conditions owing to the change of the seasons, and which can provide dehydrated air of a reduced moisture content not higher than a predetermined level, irrespectively of the seasons of the year, at the cost of minimum energy consumption.

2. Brief Description of the Prior Art

As is well known in the art, fuel consumption required in operation of a blast furnace decreases if the furnace is allowed to operate with air of a reduced moisture content. It is also known that for stable operation of the furnace it is essential to minimize variations in the moisture content of air supplied to the furnace. Various processes and apparatus have heretofore been proposed for dehydration of air to be supplied to a blast furnace. They may be classified into two types of technology, one type in which compressed air is dehydrated at the output side of a blower, as disclosed in Japanese laid-open patent application No. 69406/1976 (Japanese examined patent publication No. 44724/1977), and the other type in which atmospheric air is dehydrated at the input side of a blower, as disclosed in Japanese laid-open patent application No. 61056/1974. Generally, the dehydration process is carried out in both types using regenerative hygroscopic agent which may be in the form of solid or liquid.

In dehydration of air at the output side of the blower, a stream of compressed air must be processed which normally has a pressure of 3 to 5 Kg/cm$^2$ gauge and a temperature of 150° to 250° C., and therefore, strong, durable and complicated instruments are required. Furthermore, it is technically difficult to use liquid hygroscopic agents which are less expensive in both initial installation and maintenance costs.

Dehydration of atmospheric air at the input side of the blower is technically less difficult than dehydration of compressed air at the output side of the blower, and may be carried out using inexpensive liquid hygroscopic agents. In this case, however, the change in the temperature and humidity of intake atmospheric air poses a serious problem. This is especially true in those areas where the atmospheric conditions vary to a great extent according to the change of the seasons of the year. The dehydration process must be suitably carried in response to the change in the atmospheric conditions, or otherwise it is impossible to produce dehydrated air of a reduced moisture content not higher than a predetermined level, irrespectively of the seasons of the year, as required for stable operation of the blast furnace. This problem due to the change in the atmospheric conditions is not encountered in the dehydration process for general air conditioning. In fact it is not necessary for the purpose of air conditioning to dehydrate air in winter. In contrast, the blast furnace is not allowed to stop operating and must be maintained under constant operating conditions throughout the year, and, therefore, requires a large volume of dehydrated air of a reduced moisture content not higher than a predetermined level in all seasons.

Accordingly, the requirements in the operation of the blast furnace, as discussed above, are not fully met by mere application of dehydration processes and apparatus which are known for air conditioning. In fact various dehydration processes and apparatus have heretofore been proposed for air conditioning, in which atmospheric air is dehydrated by bringing it into contact with regenerative hygroscopic liquid and the used hygroscopic liquid is regenerated. For example, U.S. Pat. No. 2,881,853 to G. A. Kelley discloses an apparatus and method for conditioning air wherein atmospheric air is successively processed in first and second cooling and dehydrating zones, and functions of the respective zones are controlled in accordance with the change in the specific gravity of the used hygroscopic liquid; U.S. Pat. No. 3,064,952 to R. W. Brown teaches a system for conditioning air wherein air, which has been passed through dehydration means, is passed through a heat exchanger so as to adjust the relative humidity of the air; U.S. Pat. No. 3,712,026 to Griffiths et al. discloses an enthalpy exchange system utilizing a hygroscopic solution wherein latent and sensible heat are transferred between said solution and intake air in at least one intake tower, and latent and sensible heat are exchanged between said solution and exhaust air in at least one exhaust tower, and; U.S. Pat. No. 3,750,369 to D. H. Friedland teaches a system for controlling the moisture content of air using a hygroscopic liquid in which the liquid level and temperature of the hygroscopic liquid are maintained constant in the regeneration zone, and the regenerated liquid is returned to a reservoir for the circulating liquid in such a controlled manner that the density of the liquid in the reservoir may be maintained constant. However, the first-mentioned two patents do not contemplate winter operation and, thus, give no solution to the problem as to how the hydroscopic liquid may be regenerated in winter with minimum energy consumption. The third-mentioned patent contemplates winter operation. However, the moisture content of the treated air increases in winter. Finally, the system according to the last-mentioned patent is totally unsuitable for regeneration of a large volume of hygroscopic liquid, which is inevitable in dehydration of a large volume (2,000 to 12,000 Nm$^3$/min, where N represents normal temperature and pressure) of air. After all, the prior art processes and systems disclosed in these patents may be suitably applied in universal air conditioning for buildings. However, none of them gives a satisfactory solution to the problem involved in operation of a blast furnace, which requires a large volume of dehydrated air of a reduced moisture content not higher than a predetermined level throughout the year.

SUMMARY OF THE INVENTION

The object of the invention is to provide an apparatus for continuous dehydration of atmospheric air to be supplied to a blast furnace, in which it is possible by bringing atmospheric air into contact with regenerative hygroscopic liquid at the input side of a blower to prepare a large volume of dehydrated air required in operation of a blast furnace, the volume of the required air being, for example, 2,000 to 12,000 Nm$^3$/min, the absolute humidity of the required air being, for example, a certain value not higher than 9.0 g/Nm$^3$ with the allowable variation of ±0.5 g/Nm$^3$, irrespectively of the seasons of the year. More particularly, the object of the invention is to provide such an apparatus of a large size having such an improved controllability that the regeneration of the partially spent hygroscopic liquid can be carried out precisely and effectively in accordance with the change in the regeneration load due to the change in atmospheric conditions, at the cost of minimum energy consumption, whereby desirably stable and economical operation of the blast furnace may be ensured even in the districts where the climate considerably changes with the seasons of the year.

The above-mentioned object can be achieved, in accordance with the invention by an apparatus for continuous dehydration of atmospheric air to be supplied by a blower furnace comprising a dehydration assembly provided with at least one dehydration means for contacting a stream of intake atmospheric air with regenerative hygroscopic liquid so as to reduce the moisture content of the air, a regeneration assembly provided with at least one regeneration means for contacting at least a part of the hygroscopic liquid which has been used in the dehydration assembly with another stream of intake atmospheric air under heating by a fluid heating medium so as to regenerate said part of the hygroscopic liquid, piping means for circulating through the or each said dehydration means the so regenerated hygroscopic liquid together with any remainder of the hygroscopic liquid which has been used in the dehydration assembly, and a duct for passing the dehydrated air coming from the dehydration assembly to the input side of said blower, characterized in that (a) a cylinder is provided through which at least a part of the hygroscopic liquid flowing through said piping means is caused to flow so as to provide a liquid head of a predetermined height; (b) means for continuously detecting the concentration of the hygroscopic liquid flowing through said cylinder is provided; (c) said regeneration assembly is of such a size that it can handle the maximum regeneration load expected through the year, and is divided into a plurality of regeneration units, each regeneration unit being provided with the regeneration means for its own, means for controlling the flow rate of the fluid heating medium introduced into said regeneration means in accordance with a signal from said means for detecting the concentration of the hygroscopic liquid, and means for controlling the flow rate of the hygroscopic liquid introduced into said regeneration means directly or indirectly in accordance with a signal from said means for detecting the concentration of the hygroscopic liquid, whereby each unit is controllably operable independently of other units, and; (d) each regeneration unit is further provided with at least one heat exchanger for transferring sensible heat of at least one fluid, of the regenerated hygroscopic liquid, fluid heating medium and air, leaving the regeneration means of said unit to at least one fluid, of the hygroscopic liquid to be regenerated and intake atmospheric air, introduced into said unit.

The hygroscopic liquid used in operation of the apparatus according to the invention is an aqueous solution of a hygroscopic substance, such as lithium chloride, lithium bromide or triethylene glycol. The proportions of the hygroscopic substance and water in the solution, that is the concentration of the hygroscopic substance in the hygroscopic liquid is set at a certain value within the range between 35 and 50% by weight, depending upon the atmospheric conditions, but varies during the passage of the liquid through the apparatus of the invention.

A more complete appreciation of the invention and many of the attendant advantages thereof will readily be obtained as the same becomes better understood by reference to the following detailed description when considered in connection with the accompanying drawings.

BRIEF DESCRIPTION OF THE DRAWINGS

In the various figures the same reference numerals are used for equivalent parts.

DETAILED DESCRIPTION OF THE PREFERRED EMBODIMENTS OF THE INVENTION

Figure 1:
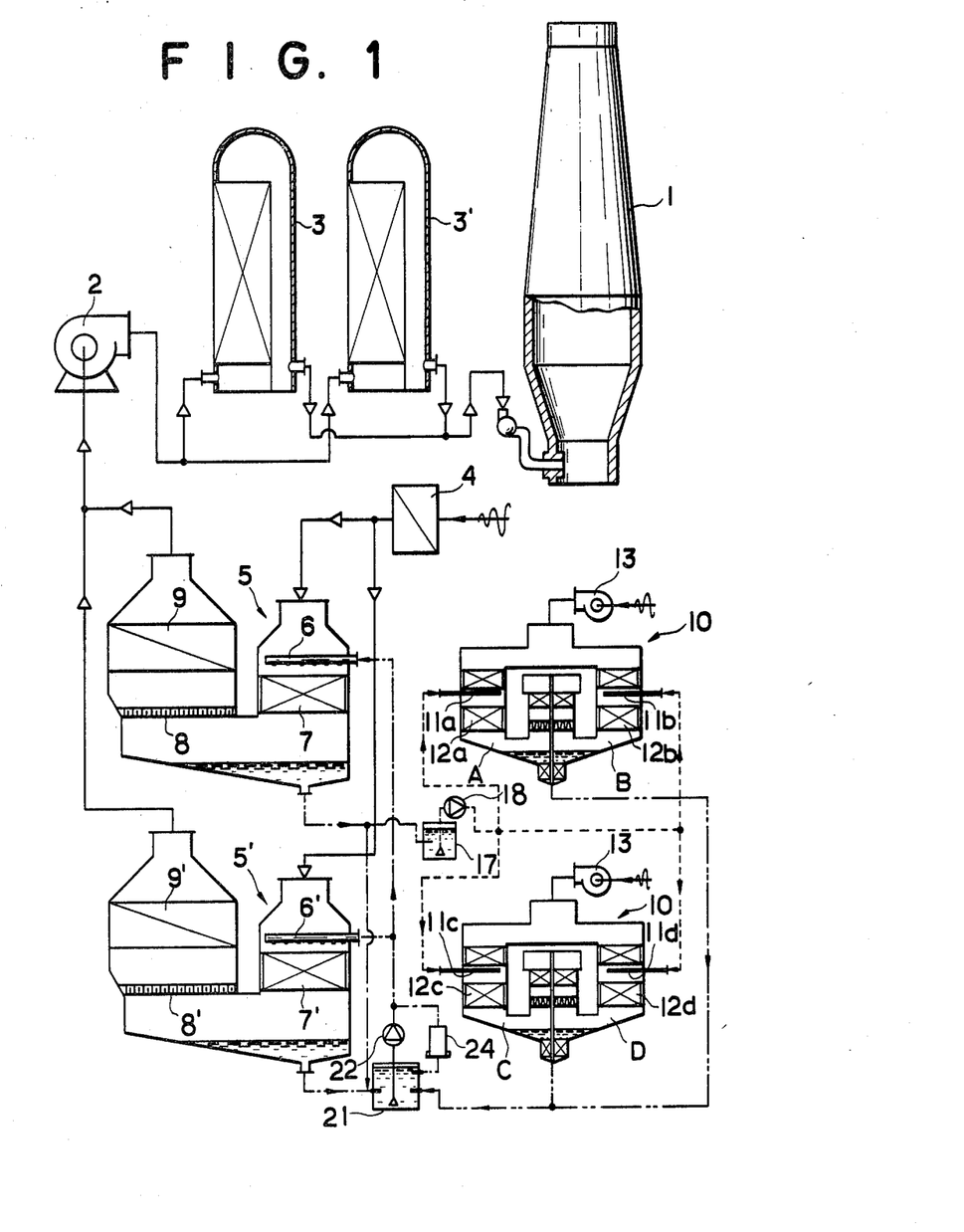
FIG. 1 schematically illustrates the incorporation of one embodiment of the invention in a blast furnace installation.

Referring to FIG. 1, the illustrated installation for supplying air to a blast furnace 1 comprises a blower or compressor 2 specially designed for use in the operation of a blast furnace and a pair of air heating furnaces or hot stoves 3, 3'. Air is compressed by the blower 2, heated by passing through one of the hot stoves 3 or 3' and then introduced into the blast furnace 1. The blower 2 is of such a size that it can provide 2,000 to 12,000 Nm$^3$ /min of air, depending on the size of the blast furnace 1, the air having a pressure of 3 to 5 Kg/cm$^2$ gauge at the output side of the blower. Each hot stove 3 or 3' contains a stack of regenerative material, such as laid refractory bricks, and is operated by alternately heating the regenerative material with a hot gas (combustion gas) from a separate source and bringing the compressed air from the blower 2 in contact with the heated regenerative material. It will be appreciated that at least a pair of such hot stoves are required for continuous supply of hot compressed air to the blast furnace.

The apparatus in accordance with the invention for dehydrating atmospheric air is installed at the input side of the blower 2. More specifically a dehydration assembly is incorporated into an air passage between a bag filter 4 through which atmospheric air is taken in and the blower 2. While the dehydration assembly may comprise a single dehydrating tower, it preferably comprises a pair of dehydrating towers 5, and 5' arranged in parallel, as shown in FIG. 1. This is because when it becomes necessary to stop the operation of one of the towers for repair or other purposes, the other tower ensures continuous operation of the whole installation. The dehydrating tower 5 contains dehydration means comprising means 6 for spraying hygroscopic liquid and a heat exchanger 7 located below the spray means 6. Atmospheric air, which has been inhaled by the blower 2 through the bag filter 4, is brought into contact with the hygroscopic liquid being sprayed by the spray means 6, whereupon a quantity of moisture in the air is condensed and absorbed by the hygroscopic liquid, which is cooled by the heat exchanger 7, through which cold water or brine (sea water) is circulated. The heat exchanger 7 removes the heat of condensation of the moisture and some of the residual sensible heat of the hygroscopic liquid which has been created but not yet completely removed in the regeneration treatment which will be described hereinafter. The air, which has been dehydrated by passing through the dehydration means, is then caused to pass through a mist separator 8 and filter 9 to the input side of the blower 2. The structure and function of the dehydrating tower 5' are the same as those of the tower 5 described above except for the fact that only a part of the partially spent hygroscopic liquid leaving the tower 5 is caused to pass to the regeneration treatment while the remainder of the liquid from the tower 5 and all of the liquid from the tower 5' are passed to a tank for circulation. Parts of the tower 5', are designated in FIG. 1 by the same numeral with a prime mark.

As far as no emergency occurs the blower 2 is allowed to operate so as to keep a certain constant state of operation throughout the whole year. Accordingly, the air output of the blower can be unchanged throughout the year. However, the temperature and moisture content of air inhaled through the bag filter 4 fluctuates considerably fluctuate with the seasons of the year. In order to control the absolute humidity of air introduced into the input side of the blower 2 so that it falls within the range acceptable for a predetermined level, it is necessary to supply hygroscopic liquid of a predetermined concentration to the spray means 6, 6', and to control the flow rate of a coolant supplied to the heat exchanger 7, 7'. One of the important features of the invention resides in the fact that precise control of the concentration of the hygroscopic liquid has been made possible by the invention with minimum energy consumption in the regeneration of the hygroscopic liquid, as described hereinafter. Control of the flow rate of the coolant may be effected by detecting the dew point of air leaving the dehydrating towers 5, 5' and controlling the flow rate of the coolant supplied to the heat exchanger 7, 7' in accordance with the detected dew point. An instrument for detecting the dew point of the dehydrated air and a system for controlling a fluid flow rate in accordance with the detected dew point of the dehydrated air are well known in the art. In addition to such known control at the side of the dehydration assembly, the invention contemplates control at the side of the regeneration assembly, which constitutes the crux of the invention.

Figure 2:
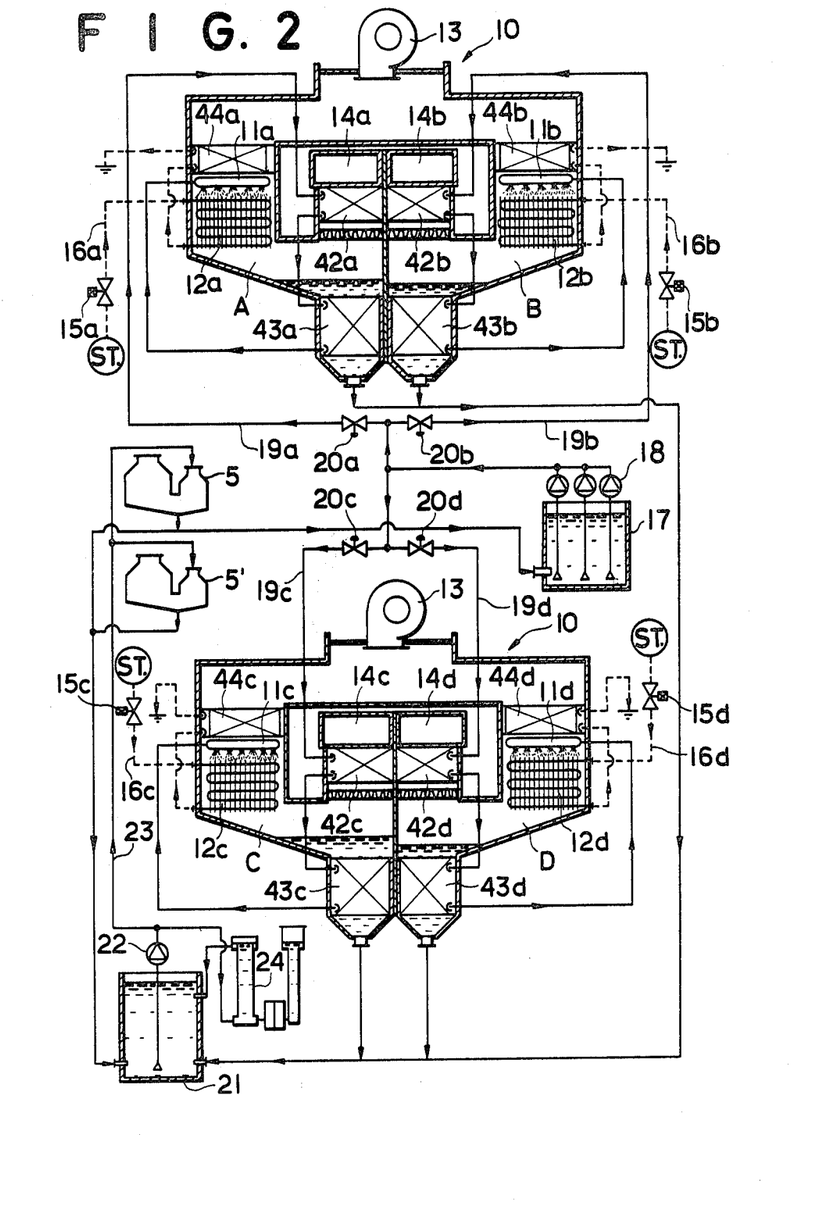
FIG. 2 illustrates a vertical cross-section of the regeneration assembly shown in FIG. 1, which is divided into four units, as well as passages of various fluids.

The apparatus in accordance with the invention further comprises a regeneration assembly 10, which is divided into plural regeneration units A, B, C and D. Although the regeneration assembly 10 comprises, in the illustrated embodiment, one regenerating tower, which is divided into two units A and B, and another regenerating tower, which is divided into two units C and D, it may comprise one tower divided into four units. Because these units are conveniently of the same structure, corresponding parts of the respective units A, B, C and D are designated in the drawings by the same numeral accompanied by letters a, b, c and d, respectively. In the following description such letters will be omitted where no confusion occurs. In each unit there is provided regeneration means comprising means 11 for spraying spent hygroscopic liquid to be regenerated and a heat exchanger 12 (a steam heater) located below the spray means 11. The regeneration assembly 10 has such a size that it can handle the maximum regeneration load expected in the year, that is it can well serve even when the difference in concentration between the hygroscopic liquid supplied to the dehydration assembly and the hygroscopic liquid leaving the dehydration assembly is the highest in the year. In other words the regeneration assembly 10 must be constructed of such a size that it has a capacity of handling the maximum regeneration load if all of the units A, B, C and D are allowed to operate.

By means of a blower 13, atmospheric air is introduced into each unit, caused to pass therethrough and withdrawn therefrom through an exhaust outlet 14. This air serves as a medium for carrying some of the moisture contained in the partially spent hygroscopic liquid being sprayed by the spray means 11, out of the system. The heat of evaporation required for evaporating such moisture in the partially spent hygroscopic liquid is provided by the heat exchanger 12 of a finned tube type, to which steam of a constant pressure and a constant temperature is supplied from a steam source ST through a valve 15 and a conduit 16.

The spray means 11 of each unit is provided with piping for supplying thereto the hygroscopic liquid to be regenerated that is a part of the liquid which has passed through the dehydration assembly and, thus, has been somewhat diluted. In the illustrated embodiment, a part (for example about one third) of the hygroscopic liquid which has passed through the dehydrating tower 5 is passed to a tank 17, where it forms a pool of the liquid to be regenerated. The remaining part of the hygroscopic liquid from the tower 5 and all of the hygroscopic liquid from the tower 5' are passed to a tank 21, from which the liquid is circulated by means of a pump 22 through a pipe 23 to the respective spray means 6, 6' of the dehydration assembly. Alternatively, the hygroscopic liquid from the tower 5 and that from the tower 5' may be combined together, and a part of the combined liquid may be passed to the tank 17 for regeneration while the remaining part of the combined liquid is passed to the tank 21 for circulation. There are provided pumps 18, by which the liquid, in the tank 17, to be regenerated is passed through respective valves 20 and branched pipes 19 to the respective spray means 11 of the respective units. The regenerated hygroscopic liquid leaving the respective units are returned to the tank 21 for re-use.

Figure 3:
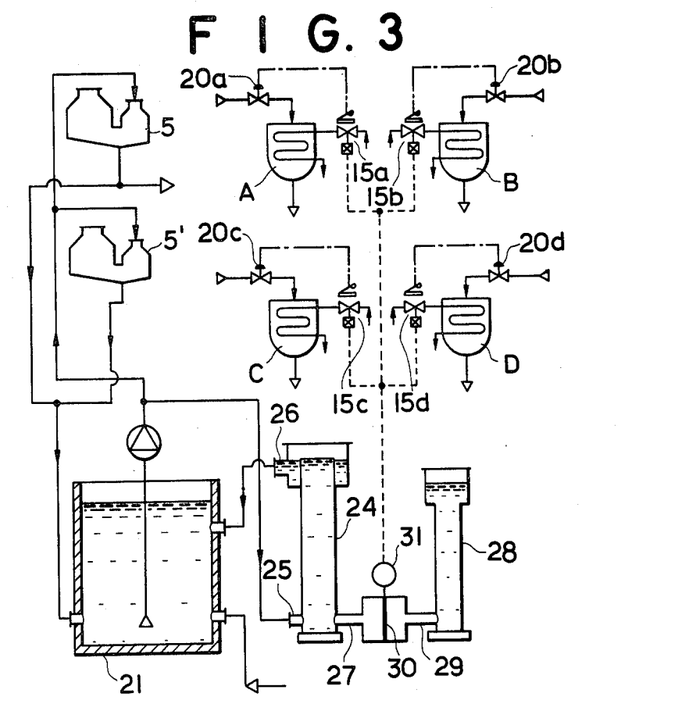
FIG. 3 is a flow diagram illustrating means for detecting the concentration of the hygroscopic liquid and a control system by this means.
Figure 4:
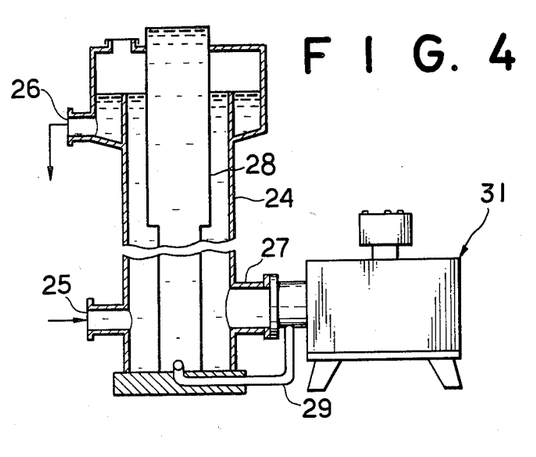
FIG. 4 is a partially cut away view for illustrating preferred means for detecting the concentration of the hygroscopic liquid.

The apparatus according to the invention is provided with a cylinder 24 through which at least a part of the circulating hygroscopic liquid is caused to flow so as to provide a liquid head of a predetermined height. Preferably, the cylinder 24 is located in the passage of the hygroscopic liquid from the tank 21 to the spray means 6, 6' of the dehydrating tower 5, 5'. As shown in FIG. 3, the cylinder 24 comprises a vertical cylinder having an open top and a liquid inlet 25 at the lower portion. The hygroscopic liquid is introduced through the liquid inlet 25 into the cylinder 24, forced flow upwardly therethrough, and allowed to overflow whereby a liquid head of a predetermined height is provided. The overflowing liquid is allowed to pass through a liquid outlet 26 and returns to the tank 21. At the lower portion of the cylinder 24 there is provided a tube 27 for leading the liquid. The tube 27 is communicated with another tube 29 via a liquid impermeable membrane 30, the tube 29 being connected to the lower portion of a reference cylinder 28 filled with a predetermined height of a non-volatile reference liquid. When the pressure of the hygroscopic liquid in the tube 27 varies in accordance with the change in the regeneration load, the membrane 30 is displaced. The displacement of the membrane 30 is electrically detected by a differential pressure detector 31. FIG. 4 depicts a preferred form of the concentration detecting means, in which the reference cylinder 28 having an upper portion of a larger diameter is coaxially located in the cylinder 24, and made of a material having a good thermal conductivity. This preferred form is advantageous in that even if the temperature of the hygroscopic liquid flowing through the cylinder changes to some extent, errors in the detected values of the concentration due to the change in the temperature of the liquid are minimized. When compared with a level detector or a level control device utilizing a float, which have heretofore been used in a wet process dehydration assembly of this kind, the concentration detecting means disclosed herein can directly read the concentration without being adversely affected by ripples on the liquid surface, and thus, makes it possible to precisely detect the change in the concentration with time.

The signal of the concentration detecting means, that is the value electrically detected by the differential pressure detector 31 is then transmitted, as schematically shown in FIG. 3, to the respective valves 15 for controlling the flow rate of the fluid heating medium (steam) introduced into the respective regeneration means in accordance with the transmitted signal, and further to the respective valves 20 for controlling the flow rate of the hygroscopic liquid introduced into the respective regeneration means in accordance with the transmitted signal. In a case where the regeneration load is relatively low so that one or more regeneration units may be allowed to stop operation, the value detected by the differential pressure detector 31 may also be utilized to stop supply of atmospheric air to such units and to cause one or more pump(s) 18 to stop operating.

Figure 5:
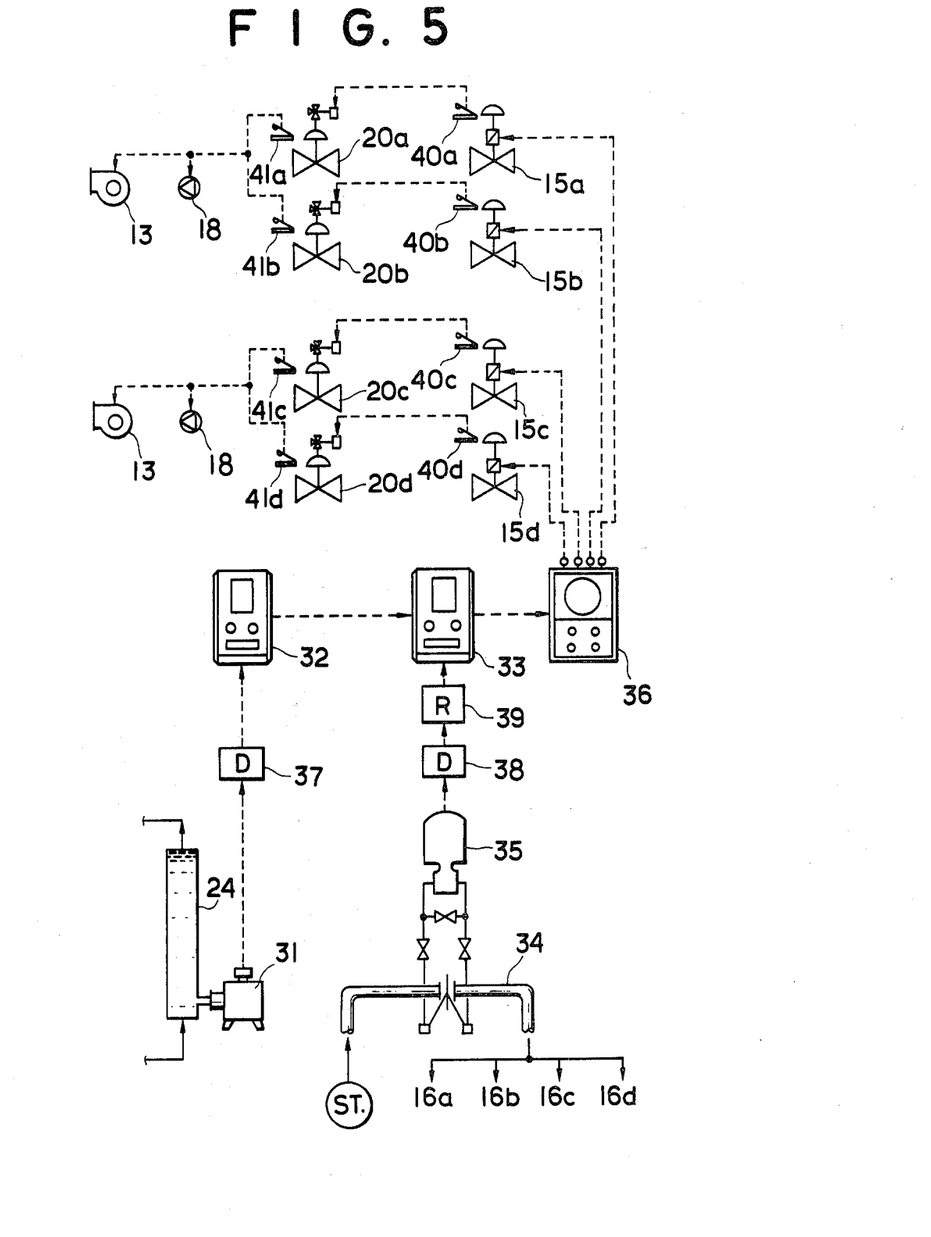
FIG. 5 is a flow diagram illustrating a preferred system for controlling the operation of the apparatus in accordance with the invention.

A prepared system for controlling the operation of the apparatus is now described with reference to the flow diagram shown in FIG. 5. In FIG. 5, the numeral 32 designates an instrument for indicating the deviation of the concentration of the hygroscopic liquid (hereinafter referred to as concentration deviation indicator), the numeral 33 designates an instrument for instructing the flow rate of the steam (hereinafter referred to as steam flow rate instructor), the numeral 34 designates a steam main duct through which steam is passed from the steam source ST to the respective conduits 16 (FIG. 2) in the respective regeneration units, the numeral 35 designates a pair of differential pressure detectors for detecting the flow rate of steam flowing through the main duct 34, and the numeral 36 designates a proportioning instrument.

Let's assume a case wherein the maximum load expected throughout the year is 5,700 Kg of moisture per hour. The apparatus in full operation can remove 5,700 Kg of moisture per hour from atmospheric air. In other words the regeneration assembly of the apparatus is of such a size that it can remove 5,700 Kg of moisture per hour from the partly spent hygroscopic liquid. With respect to such apparatus we will describe how to control the operation at the time the regeneration load is reduced to 2,700 Kg of moisture per hour. At this time the load of the regeneration assembly is 47.4% of the maximum load. If the regeneration assembly is divided into equivalent units A, B, C and D, it is sufficient to allow two of the four units to operate for handling such load as 47.4% of the maximum.

At first a value of the concentration of the circulating hygroscopic liquid is selected depending upon the particular season and the selected value is preset in the concentration deviation indicator 32. It is advantageous to select and preset a high value in a season during which the dehydration load is high, and a low value in a season during which the dehydration load is low. In the discussed example, the concentration of the circulating hygroscopic liquid (aqueous solution of lithium chloride) is preset at 40% by weight (of lithium chloride).

During the operation based on this preset concentration, the differential pressure detector 31 detects the concentration of the operating liquid, and transmits the detected value through a distributor 37 to the concentration deviation indicator 32, which in turn transmits the deviation of the detected value from the preset value to the steam flow rate instructor 33 so as to change the value of the steam flow rate which has been preset in the instructor 33. The total flow rate of the steam being supplied to the regeneration assembly 10 is detected by the differential pressure detectors 35 (one being for a large amount of flow, while the other is for detecting a small amount of flow), and the output from the detectors 35 is transmitted via a distributor 38, a signal limiter and adder 39 to the steam flow rate instructor 33. The output signal from the steam flow rate instructor 33 is proportioned in the proportioning instrument 36 and controls the respective valves 15 in a cascade manner in accordance with the signal from the concentration deviation instructor 32. The output signal from the steam flow rate instructor 33 can vary, for example, within the range between 1 and 5 volts. When the output varies within the range between 1 and 2 volts, the valve 15a is controlled so that it is opened to a degree proportional to the output while all other valves are kept closed. When the output varies within the range between 2 and 3 volts, the opening degree of the valve 15b is porportionally controlled while the valve 15a is fully opened and the valves c and d are kept closed. If the output is within the range from 3 to 4 volts, the valve 15c is partially opened while the valves 15a and b are fully opened and the valve d is kept closed. Further, when the output is within the range from 4 to 5 volts, the valve d is partially opened while all other valves are kept fully opened. By the term "cascade" we mean such a manner of control. In the stationary operation of the discussed example wherein the percent load is 47.4%, the valve 15a is fully opened while the valve 15b is partially opened to a degree corresponding to the particular output within the range between 2 and 3 volts and the valves c and d are kept closed. If the concentration of the circulating hygroscopic liquid in the cylinder 24 becomes diluted to a level below the preset concentration value, the valve 15b is forced to open to a greater degree so as to increase the regeneration power. If insufficient with the valve 15b fully opened, the valve 15c is forced to open in response to the output signal.

The flow rate of the hygroscopic liquid supplied to the respective spray means 11 of the respective units is controlled by means of the respective valves 20 located in the respective branched pipes 19. In the illustrated embodiment each valve 15 for controlling the flow rate of steam is provided with a contact element 40 which may go on or off in accordance with the degree of opening of the valve 15. When the valve 15 has opened to a certain degree, the element 40 actuates the corresponding valve 20 to fully open. Unlike the valve 15, which may open to any degree of opening in response to the output signal, the valve 20 may be an electromagnetically actuatable valve. The valve 20 is also provided with a contact element 41 which may effect on-off control of one or more pumps 18 and one of the blowers 13 in accordance with the switching of the valve 20.

When a volume as large as about 5,000 Nm$^3$/min of air is processed in the apparatus according to the invention, it is required in general to circulate through the apparatus a quantity as large as about 20 tons of the hygroscopic liquid (40% LiCl aq. basis). Even in such a large scale operation, the cascade control of the respective valves 15 in conjunction with the control of the respective valves 20, as disclosed herein, makes it possible to precisely control the concentration of the hydroscopic liquid supplied to the spray means 6, 6' of the dehydration assembly so that it is maintained within the narrow range between about 0.5% below the preset value and about 0.5% above the preset value. In addition, it is possible to avoid any wasteful consumption of regeneration energy, because the selected number of units take shares in necessary and sufficient regeneration work and any unnecessary operation is avoided throughout the year.

In order to reduce the consumption of both regeneration energy in the regeneration assembly and cooling energy in the dehydration assembly, each regeneration unit is provided with at least one heat exchanger for transferring sensible heat of at least one fluid, of the regenerated hygroscopic liquid, steam drain and air, leaving the regeneration means of said unit to at least one fluid, of the hygroscopic liquid to be regenerated and intake atmospheric air, introduced into said unit. In the embodiment shown in FIG. 2, each unit is provided with a gas-liquid heat exchanger 42 for transferring sensible heat of the hot wet air leaving the regeneration means of said unit to the partially spent hygroscopic liquid to be introduced into the regeneration means of said unit, a liquid-liquid heat exchanger 43 for transferring sensible heat of the regenerated hygroscopic liquid leaving the regeneration means of said unit to the partially spent hygroscopic liquid to be introduced into the regeneration means of said unit, and a gas-liquid heat exchanger 44 for transferring sensible heat of the steam drain leaving the regeneration means of said unit to the intake atmospheric air to be introduced into the regeneration means of said unit.

The gas-liquid heat exchanger 42 is a finned tube heat exchanger, which is located immediately upstream of the exhaust outlet 14 in the direction of the flow of air. The liquid to be regenerated is passed through the tubes of the heat exchanger 42 while the hot wet air is passed through the space outside the tubes. The liquid to be regenerated which has passed the valve 20 enters the gas-liquid heat exchanger 42 and then the liquid-liquid heat exchanger 43, which is also a finned tube heat exchanger located in a sump of the regeneration unit. Thus, the liquid to be regenerated is, prior to being introduced into the regeneration means, to receive sensible heat from both the exhaust air and regenerated liquid leaving the regeneration means. The liquid-liquid heat exchanger 43 further serves to reduce the cooling load of the heat exchangers 7, 7' in the dehydration assembly. The gas-liquid heat exchanger 44 is also a finned tube heat exchanger located in the passage of air upstream of the spray means 11. The steam drain which has left the heat exchanger 12 is passed through the tube of the heatexchanger 44 for heat exchange with the intake air so as to reduce the amount of heat required in the heat exchanger. Since such heat exchangers 42, 43 and 44 are provided in each regeneration unit, and are allowed to operate when the unit is operating independently of the operation of other unit or units, they do not adversely affect the control system, utilizing the concentration detecting means in accordance with the invention.

From the description as given above, it will be appreciated by a person skilled in the art that the apparatus in accordance with the invention will bring about advantageous results in blast furnace operation especially in those districts where the climates vary considerably with the seasons of the year. Various modifications to the disclosed embodiment are possible without departing from the spirit of the invention, depending upon the climates of the particular area where the apparatus is installed and/or upon the particular size of the blast furnace. For example, the regeneration assembly may be divided into two, three or five units. Further, any other suitable systems may be utilized for controlling the concentration detecting means.

We claim:

1. An apparatus for continuous dehydration of atmospheric air to be supplied by a blower to a blast furnace comprising a dehydration assembly provided with at least one dehydration means for contacting a stream of intake atmospheric air with regenerative hygroscopic liquid so as to reduce the moisture content of the air, a regeneration assembly provided with at least one regeneration means for contacting at least a part of the hygroscopic liquid which has been used in the dehydration assembly with another stream of intake atmospheric air under heating by a fluid heating medium so as to regenerate said part of the hygroscopic liquid, piping means for circulating through the or each said dehydration means the so regenerated hygroscopic liquid together with any remainder of the hygroscopic liquid which has been used in the dehydration assembly, and a duct for passing the dehydrated air coming from the dehydration assembly to the input side of said blower, characterized in that (a) a cylinder is provided through which at least a part of the hygroscopic liquid flowing through said piping means is caused to flow so as to provide a liquid head of a predetermined height;

(b) means for continuously detecting the concentration of the hygroscopic liquid flowing through said cylinder is provided;

(c) said regeneration assembly is of such a size that it can handle the maximum regeneration load expected throughout the year, and is divided into a plurality of regeneration units, each regeneration unit being provided with the regeneration means for its own, means for controlling the flow rate of the fluid heating medium introduced into said regeneration means in accordance with a signal from said means for detecting the concentration of the hygroscopic liquid, and means for controlling the flow rate of the hygroscopic liquid introduced into said regeneration means directly or indirectly in accordance with a signal from said means for detecting the concentration of the hygroscopic liquid, whereby each unit is controllably operable independently of other units; and (d) each regeneration unit is further provided with at least one heat exchanger for transferring sensible heat of at least one fluid, of the regenerated hygroscopic liquid, fluid heating medium and air, leaving the regeneration means of said unit to at least one fluid, of the hygroscopic liquid to be regenerated and intake atmospheric air, introduced into said unit.

2. An apparatus in accordance with claim 1 wherein said means for detecting the concentration of the hygroscopic liquid is to detect the pressure, at a lower portion of said cylinder, of the hygroscopic liquid flowing through said cylinder, the detection of the liquid pressure being carried by contacting the hygroscopic liquid with reference liquid of a predetermined height at said lower portion of said cylinder via a liquid impermeable membrane and detecting a displacement of said membrane.

3. An apparatus in accordance with claim 1 or 2 wherein said means for controlling the flow rate of the fluid heating medium is an electromagnetic valve capable of opening controllably, and in accordance with the degree of opening of said valve the hygroscopic liquid to be supplied to the regeneration means is started to flow or caused to stop flowing into said regeneration means.

4. An apparatus in accordance with claim 1 or 2 wherein each of said units is provided with a heat exchanger for transmitting sensible heat of hot moist air, which has passed through said regeneration means, to the partially spent hygroscopic liquid to be introduced into said regeneration means, a heat exchanger for transmitting sensible heat of the regenerated hygroscopic liquid, which has passed through said regeneration means, to the partially spent hygroscopic liquid to be introduced into said regeneration means, and a heat exchanger for transmitting sensible heat of the heating medium, which has passed through said regeneration means, to the intake atmospheric air to be introduced into said regeneration means.

5. Apparatus according to claim 4 wherein said means for controlling the flow rate of the fluid heating medium is an electromagnetic valve capable of opening controllably, and in accordance with the degree of opening of said valve the hygroscopic liquid to be supplied to the regeneration means is started to flow or caused to stop flowing into said regeneration means.

6. An apparatus in accordance with claim 1 or 2 wherein the hygroscopic liquid comprises an aqueous solution of lithium chloride, an instrument for indicating the deviation of the concentration of lithium chloride in said solution is provided which presets the concentration at a certain value within the range of 35 to 50% by weight of lithium chloride in accordance with the particular atmospheric conditions under which said apparatus is allowed to operate, said preset concentration value being capable of displacing the signal from said means for detecting the concentration of the hygroscopic liquid.

7. Apparatus according to claim 6 wherein said means for controlling the flow rate of the fluid heating medium is an electromagnetic valve capable of opening controllably, and in accordance with the degree of opening of said valve the hygroscopic liquid to be supplied to the regeneration means is started to flow or caused to stop flowing into said regeneration means.

8. An apparatus in accordance with claim 1 or 2 wherein said regeneration assembly is divided into four regeneration units.

9. Apparatus according to claim 8 wherein said means for controlling the flow rate of the fluid heating medium is an electromagnetic valve capable of opening controllably, and in accordance with the degree of opening of said valve the hygroscopic liquid to be supplied to the regeneration means is started to flow or caused to stop flowing into said regeneration means.

* * * * *

UNITED STATES PATENT AND TRADEMARK OFFICE
CERTIFICATE OF CORRECTION

PATENT NO. : 4,178,158
DATED : December 11, 1979
INVENTOR(S) : Toru Hoshida et al It is certified that error appears in the above-identified patent and that said Letters Patent are hereby corrected as shown below:

At Column 5, line 27, - after 5' insert -- which respectively correspond to those of the tower 5, --

At Column 5, line 35, - after the word "considerably" delete -- fluctuate --

At Column 12, Claim 9, line 1, - delete "claim 8" and insert in its place -- claim 5 --

Signed and Sealed this

Twenty-fifth Day of March 1980

[SEAL]

Attest:

SIDNEY A. DIAMOND

Attesting Officer

Commissioner of Patents and Trademarks